US008054631B2

(12) United States Patent
Abrams

(10) Patent No.: US 8,054,631 B2
(45) Date of Patent: Nov. 8, 2011

(54) COMPUTER PACKAGING SYSTEM

(75) Inventor: Roger K. Abrams, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1274 days.

(21) Appl. No.: 11/685,361

(22) Filed: Mar. 13, 2007

(65) Prior Publication Data
US 2008/0230439 A1    Sep. 25, 2008

(51) Int. Cl.
*H05K 7/16* (2006.01)
(52) U.S. Cl. ........ 361/725; 361/724; 361/732; 710/303; 439/638
(58) Field of Classification Search .................. 257/685; 361/679.29, 679.4, 679.32, 724, 725, 732, 361/683, 686; 726/19, 34, 35; 340/568.1, 340/568.4; 206/723; 395/500.46, 281, 283; 703/25; 710/303; 439/638; 312/223.2, 263, 312/293.3
See application file for complete search history.

(56) References Cited

U.S. PATENT DOCUMENTS

| 5,091,713 | A | * | 2/1992 | Horne et al. ................. 340/541 |
| 5,555,156 | A | * | 9/1996 | Decante .................... 361/679.57 |
| 5,675,321 | A | * | 10/1997 | McBride .................... 340/568.2 |
| 5,706,179 | A |   | 1/1998 | Palatov |
| 5,822,184 | A | * | 10/1998 | Rabinovitz ............... 361/679.31 |
| 6,070,956 | A | * | 6/2000 | Yates ......................... 312/223.3 |
| 6,108,198 | A | * | 8/2000 | Lin ........................... 361/679.39 |
| 6,144,561 | A | * | 11/2000 | Cannella et al. ............... 361/796 |
| 6,215,656 | B1 |   | 4/2001 | O'Neal et al. |
| 6,288,333 | B1 | * | 9/2001 | Liu et al. ........................ 174/563 |
| 6,292,890 | B1 |   | 9/2001 | Crisan |
| 6,711,002 | B1 | * | 3/2004 | Fan ........................... 361/679.02 |
| 2002/0026549 | A1 |   | 2/2002 | Powers et al. |
| 2003/0033450 | A1 |   | 2/2003 | Appleby-Alis |
| 2005/0021578 | A1 |   | 1/2005 | Chen et al. |
| 2006/0271773 | A1 |   | 11/2006 | Marquiz |

\* cited by examiner

*Primary Examiner* — Chris Chu
(74) *Attorney, Agent, or Firm* — Cantor Colburn LLP; Thomas Tyson

(57) ABSTRACT

A packaging system for transferring data from an external resource to the packaging system is disclosed. The packaging system includes a package and a computer disposed within the package. The package includes a first passage and a substantially closed interior defined by closure of the first passage. The computer includes a power connection and a communication connection. A second passage of the package is dimensioned and disposed for accessing at least one of the power connection and the communication connection with the computer disposed within the package. The computer is responsive to a supply of power from an external power supply to the power connection via the second passage, and to a communication link between the communication connection and the external resource to initiate a powered state of the computer and to transfer data from the external resource to the computer.

8 Claims, 2 Drawing Sheets

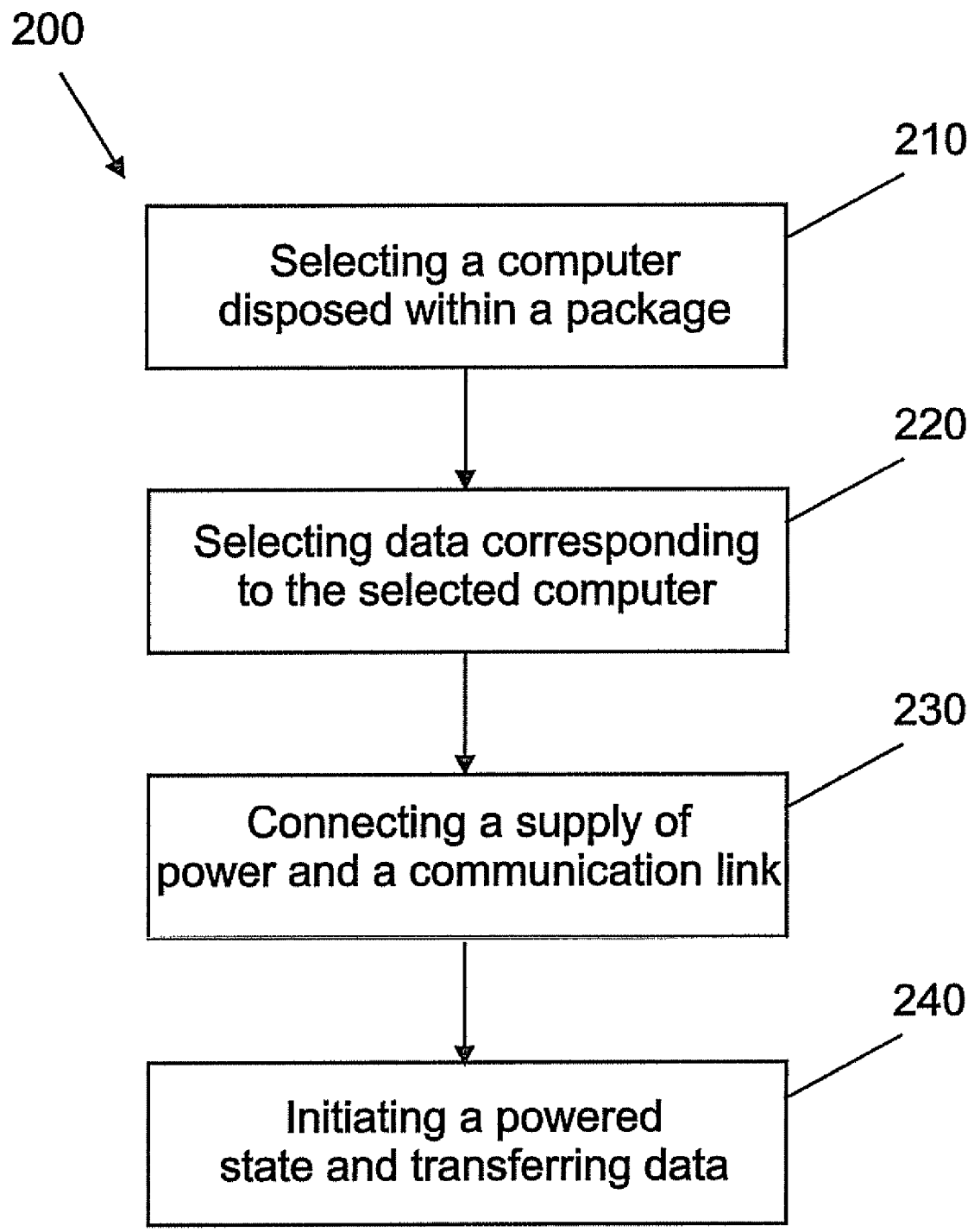

000

COMPUTER PACKAGING SYSTEM

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to packaging, and particularly computer packaging.

2. Description of Background

Before our invention, it is common for computer manufacturers to sell computers, such as point of sale computers for example, to computer resellers who then provide the computers and system implementation services, such as software installation for example, to a customer. The computer resellers can often preload the computers with customized software and/or system settings as specified by the customer. This is a convenience for the customer, as the computer then arrives at a customer site ready for use. However, preloading the customized software and/or system settings requires unpacking the computer from a package (as provided by a manufacturer of the computer system), attaching input and output devices (such as a keyboard and video monitor for example), power, and a communication link with an external resource, such as a server for example, and selecting the appropriate software and/or system settings to transfer from the server. This is a time and labor-intensive process, and has the potential to cause damage to the computer. Accordingly, there is a need in the art for a packaging arrangement that overcomes these drawbacks.

SUMMARY OF THE INVENTION

The shortcomings of the prior art are overcome and additional advantages are provided through the provision of a computer packaging system adapted for communicating data from an external resource to a computer while the computer remains within a packaging container.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which allows customized software and/or system settings to be transferred from a server to a computer without removing the computer from a packaging container.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates one example of a flow chart of process steps of a method of communicating between a computer and an external resource while the computer is disposed within a package.

Figure 1:
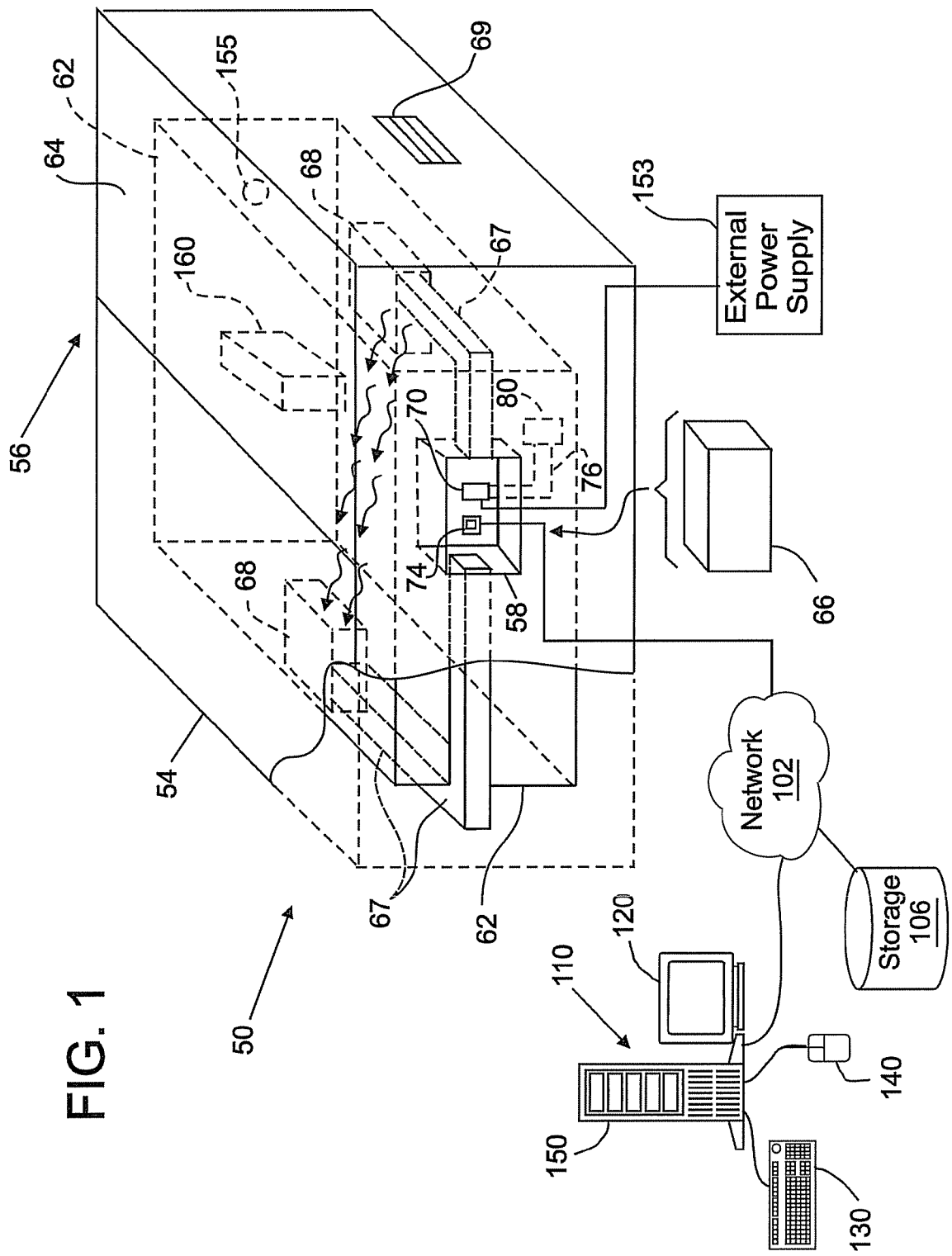
FIG. 1 illustrates one example of a computer communication system.

The detailed description explains the preferred embodiments of the invention, together with advantages and features, by way of example with reference to the drawings.

DETAILED DESCRIPTION OF THE INVENTION

An embodiment of the invention provides a packaging system that allows a computer to be preloaded with specified software and/or basic input output system (BIOS) settings without removing the computer from a packaging carton. In an embodiment, an access aperture of the packaging carton provides access to a power connection and a communications connection of the computer. The computer is responsive to connection of a supply of power to the power connection and a data link with a server via the communications connection to receive software and/or BIOS settings selected in conjunction with the server.

Referring now to FIG. 1, a packaging system 50 is depicted. The packaging system 50 includes a package 54, such as a shipment carton for example, with a loading opening 56 (also herein referred to as a first passage) and a connectivity portion 58, such as an access aperture (also herein referred to as a second passage). The system 50 further includes a computer 62 contained within the interior of the package 54. The loading opening 56 is so dimensioned as to allow insertion of the computer 62 therethrough into the package 54. It will be appreciated that closure of the loading opening 56 will define a substantially closed interior of the package 54, thereby protecting the computer 62 therein. As used herein, the term "substantially closed" shall refer to the package 64 having the loading opening 56 (such as flaps of the carton) closed, such that the computer 62 within is protected. Packaging material 64 as is known in the art (illustrated as the space between the computer 62 and the package 54) is disposed between the computer 62 and the package 54 to secure the computer 62 and prevent its movement within the package 54, thereby reducing a likelihood of damage to the computer 62 disposed within the substantially closed interior of the package 54. The packaging system 50 may also include a knock-out 66 or plug, that is disposed within the access aperture 58 to close the access aperture 58 and protect the computer 62 within the package 54. In an embodiment, the computer 62 is a point of sale computer, as is used for conducting retail sales transactions.

Environmental controls prevent overheating of the computer 62 during operation within the package 54. In an embodiment, the environmental controls include one or more ducts 67 within the packaging material 64 to provide an airflow path via the access aperture 58. The ducts 67 are dimensioned so as to channel a sufficient flow of air (represented schematically by wavy lines) through the computer 62 via ventilation ports 68 of the computer 62 to prevent overheating while operating within the substantially closed interior of the package 54. It is contemplated that in an exemplary embodiment one or more of the ducts 67 is configured to receive a forced air feed to force air to and from the ventilation ports 68. In another embodiment, the environmental controls include one or more openings 69 within the package 54 (and packaging material 64) disposed to provide an air flow path to the ventilation ports 68.

The access aperture 58 is dimensioned and disposed such that it provides access to at least one of a power connection 70 and a communications connection 74 of the computer 62 for operation and communicating data when the computer 62 is disposed within the substantially closed interior of the package 54. It will be appreciated that the access aperture 58 is smaller than the loading passage 56, and is so dimensioned as to not allow insertion of the computer 62 therethrough. In an embodiment, the access aperture 58 is approximately 3 inches by 5 inches. The communications connection 74 can be one of any communications connections adapted for communicating data, such as a serial port, a parallel port, an Ethernet port, and a universal serial bus (USB) port, for example. In an embodiment, the communications connection 74 is a wireless communications link. In an embodiment, the packaging system 50 includes an extension unit 76 for use with one or both of the power connection 70 and the communications connection 74. The example of the extension unit 76 depicted in FIG. 1 is illustrated to extend a power connection 80 disposed at one location of the computer 62 for access at another location of the computer 62 corresponding to the access aperture 58.

An external resource 110, such as a server, is in data communication with the communications connection 74 of the computer 62 via a network 102. The server 110 includes an output device, such as a display screen 120 and input devices, such as a keyboard 130 and a mouse 140. A program storage device 150 stores system, data, and application files, and, in conjunction with the input devices 130, 140 and output device 120 provides selection of the data to be transferred to the computer 62 within the package 54. Additional data, such as details relating to specific data to be loaded onto specific computers 62 for specific customers for example, may be in one or more storage devices 106 and accessed via network 102.

The network 102 can include the Internet, a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. The packaging system 50 may also utilize a number of different types of networks 102, for transfer of data from the server to one or more computers 62, such as a wired or wireless Intranet or a local area network, or a direct data connection, for example. If a link between the network 102 and the communications connection 74 is a wired link, it passes through the access aperture 58.

While an embodiment of the invention has been depicted having one computer 62 in data communication with one server 110 via the network 102, it will be appreciated that the scope of the invention is not so limited, and that the invention will also apply to other packaging system 50 arrangements, such as more than one computer 62 in data connection with the server 110, for example.

In an embodiment, the computer 62 includes a 'remote power on' capability via the communications connection 74. Subsequent to connection of an external power supply 153 to the power connection 70, the computer 62 is responsive to a signal provided by the server 110 via the communications connection 74 to initiate a powered state or power up, and begin operation. This is similar to a capability known as "wake on LAN" that can be used to power up a computer via a signal provided by a local area network. Accordingly, the remote power on capability allows the computer 62 to be powered up while disposed in the package 54 without the need to access and activate a power switch 155.

A basic input output system (BIOS) of the computer 62 is configured such that the computer 62 will initially operate independent of connection to input devices such as a keyboard or a mouse, or an output device such as a display screen, for example. This is similar to a capability known as "headless" operation, which can be used in operation of servers, for example. Such "headless" operation is distinguished from typical computers, in which the BIOS will halt operation of the computer if it determines that the computer is absent a connection to input and output devices. The BIOS of the computer 62 is also configured such that the computer 62 can boot directly from an operating system provided by the server 110 via the communications connection 74. This is similar to a capability known as preboot execution environment (PXE) to bootstrap computers using a network interface card independently of available data storage devices (such as hard disk drives) or installed operating systems. In this way, the operation of the computer 62 is defined and controlled the server 110. Accordingly, the computer 62 powers up and begins operation without removal from the package, and without connections other than the power supply to the power connection 70 and the data connection to the communications connection 74.

The computer 62 is receptive of at least one of a BIOS update and changes to BIOS settings made available by the server 110 via the communications connection 74. That is, the computer 62 is responsive to the server 110 to replace an older version of BIOS within the computer 62 with a newer version of BIOS made available by the server 110. Additionally, the computer 62 is responsive to the server 110 to receive BIOS settings (such as a BIOS setup password, and a boot device order, for example) that are made available by the server 110 to the computer 62 via communications connection 74. In an embodiment, at least one of the BIOS update and BIOS settings are transferred to the computer 62 from the server 110 via the communication connection 74 as a disk operating system "DOS" diskette image, and the DOS diskette image is executed by the computer 62 to incorporate the BIOS update and/or settings.

Accordingly, the computer 62 is responsive to a supply of power from the external power supply 153 to the power connection 70 via the access aperture 58, and to a communication link 102 between the communication connection 74 and the server 110 to initiate a powered state of the computer 62 and to transfer data from the server 110 to the computer 62 while the computer 62 remains within the substantially closed interior of the package 54.

In view of the foregoing, the packaging system 50 facilitates a method of communicating, or transferring data between the server 110 and a program storage device 160 (such as a hard disk drive) of the computer 62 in data communication with the communications connection 74 while the computer 62 is disposed within the package 54. Referring now to FIG. 2, a flow chart 200 of process steps of the method is depicted. The method begins with selecting at Step 210 the computer 62, disposed within the package 54, for transfer of data from the server 110. If the package 54 includes the knock-out 66 disposed within the access aperture 58, the method includes removing the knock-out 66. Furthermore, the forced air feed, if utilized, is connected to at least one of the ducts 67 via the access aperture 58. The method further includes selecting at Step 220 appropriate data corresponding to the computer selected at Step 210 to be transferred from the server 110 to the computer 62. The method continues with connecting at Step 230 the power supply 153 to the power connection 70 and the server 110 to the computer 62 via the communications connection 74.

The selecting, at Step 220, the appropriate data can include identifying via the server 110, a customer to whom the computer 62 will be shipped. In an embodiment, in response to connecting the computer 62 with the server 110, the server 110 determines a unique identifier associated with the computer 62 (such as a media access control (MAC) address or serial number, for example), and performs a look up to the storage device 106, such as a customer purchase database for example, to automatically select the appropriate data to be transferred from the server 110 to the computer 62.

In response to connecting the power supply 153 to the power connection 70 and the server 110 to the computer 62 via the communications connection 74, the method includes communicating, or transferring, data including an operating instruction for initiating, at Step 240 a powered state, or remotely powering up the computer 62 via the communications connection 74.

The transferring data to the computer 62 further includes transferring the selected appropriate customer-specific data, such as transferring one or more of software application data, an updated BIOS revision to the computer 62, BIOS settings to the computer 62, an operating system, and additional operating instructions to the computer 62 such as an operating instruction to restart or shut down the computer 62, for example.

As an example, in response to connecting the power supply 153 to the power connection 70 and the server 110 to the computer 62 through the network 102 via the communications connection 74, the server 110 sends the operating instruction to the computer 62 to power up. The computer 62 starts and the BIOS loads a program from the server 110 to check the revision level of the BIOS installed on the computer 62, and if necessary, loads the DOS diskette image to update the BIOS. Following the update of the BIOS, the DOS diskette image will reboot the computer 62. Following a determination by the program that the BIOS is up to date, the program proceeds to load an operating system image from the server 110. The image of the operating system from the server 110 transfers data from at least one of the program storage device 150 and the storage device 106 onto the program storage device 160 of the computer 62. Data transferred to the computer 62 can include an operating system. An operating system of the server 110 may be different from the operating system transferred to the computer 62 by the server 110. The server 110 then restarts the computer 62, and sends a series of commands to the BIOS to incorporate customer specified BIOS settings, such as a BIOS access password, for example. The server 110 then sends an operating instruction to the computer 62 to power down. In preparation for shipment to the customer, the appropriate power and communication connectors are removed, and the knock-out 66 (if used) is replaced within the access aperture 58.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A packaging system for transferring data from an external resource to the packaging system, the packaging system comprising:
   a package comprising a first passage and a substantially closed interior defined by closure of the first passage; and
   a computer disposed within the substantially closed interior, the computer comprising a power connection, a first ventilation port, a second ventilation port and a communication connection;
   wherein the first passage is so dimensioned as to allow insertion of the computer therethrough;
   wherein the package further comprises a second passage so dimensioned and disposed for accessing at least one of the power connection and the communication connection with the computer disposed within the substantially closed interior, the second passage being smaller than the first passage and so dimensioned as to not allow insertion of the computer therethrough;
   the packaging system further comprises packaging material disposed between the computer and the substantially closed interior, the packaging material comprising a first substantially enclosed ventilation duct having a first opening communicative with the second passage and a second opening communicative with the first ventilation port, the second passage, the first ventilation duct, and the first ventilation port defining a first air flow path of air received from the exterior of the package, and a second substantially enclosed ventilation duct having a first opening communicative with the second ventilation port and a second opening communicative with the second passage, the second ventilation port, the second ventilation duct, and the second passage defining a second air flow path of air received from the computer;
   wherein the computer is responsive to a supply of power from an external power supply to the power connection via the second passage, and to a communication link between the communication connection and the external resource to initiate a powered state of the computer and to transfer data from the external resource to the computer.

2. The packaging system of claim 1, wherein:
   the communication link is a wired communication link via the second passage.

3. The packaging system of claim 1, wherein:
   the computer is a point of sale computer.

4. The packaging system of claim 1, further comprising:
   an extension unit from the computer to the second passage.

5. The packaging system of claim 1, wherein:
the data comprises at least one of a basic input output system (BIOS) update, BIOS settings, software, and operating instructions for the computer.

6. The packaging system of claim 5, wherein:
the operating instructions comprise at least one of a remote power on signal, a remote restart signal, and a remote power off signal.

7. The packaging system of claim 1, further comprising:
a plug to close the second passage.

8. A packaging system for transferring data from an external resource to the packaging system, the packaging system comprising:
   a package comprising a first passage and a substantially closed interior defined by closure of the first passage; and
   a point of sale computer disposed within the substantially closed interior, the point of sale computer comprising a power connection, a first ventilation port, a second ventilation port, and a communication connection;
   wherein the first passage is so dimensioned as to allow insertion of the point of sale computer therethrough;
   wherein the package further comprises a second passage approximately 3 inches by 5 inches and disposed for accessing the power connection and the communication connection with the point of sale computer disposed within the substantially closed interior, the second passage being smaller than the first passage and so dimensioned as to not allow insertion of the point of sale computer therethrough;
   the packaging system further comprises packaging material disposed between the point of sale computer and the substantially closed interior, the packaging material comprising a first substantially enclosed ventilation duct having a first opening communicative with the second passage and a second opening communicative with the first ventilation port, the second passage, the first ventilation duct, and the first ventilation port defining a first air flow path of air received from the exterior of the package, and a second substantially enclosed ventilation duct having a first opening communicative with the second ventilation port and a second opening communicative with the second passage, the second ventilation port, the second ventilation duct, and the second passage defining a second air flow path of air received from the computer;
   wherein the point of sale computer is responsive to a supply of power from an external power supply to the power connection via the second passage, and to a communication link between the communication connection and the external resource via the second passage to initiate a powered state of the point of sale computer and to transfer data from the external resource to the point of sale computer.

* * * * *